(12) United States Patent
Kanehisa

(10) Patent No.: US 7,059,686 B2
(45) Date of Patent: Jun. 13, 2006

(54) BICYCLE HUB

(75) Inventor: Takanori Kanehisa, Sakai (JP)

(73) Assignee: Shimano Inc., Osaka (JP)

( * ) Notice: Subject to any disclaimer, the term of this patent is extended or adjusted under 35 U.S.C. 154(b) by 55 days.

(21) Appl. No.: 10/347,790

(22) Filed: Jan. 22, 2003

(65) Prior Publication Data

US 2004/0140709 A1 Jul. 22, 2004

(51) Int. Cl.
*B60B 27/00* (2006.01)
*F16C 13/00* (2006.01)

(52) U.S. Cl. .................... 301/110.5; 384/545

(58) Field of Classification Search ............ 301/110.5, 301/105.1, 109–110, 110.6, 55, 59; 384/540, 384/544, 545, 543, 546–547, 513–515
See application file for complete search history.

(56) References Cited

U.S. PATENT DOCUMENTS

| | | | |
|---|---|---|---|
| 4,580,670 A | 4/1986 | Nagano | |
| 4,986,556 A * | 1/1991 | Hartmann | 280/260 |
| 5,324,100 A | 6/1994 | James | |
| 5,549,396 A | 8/1996 | Chiang | |
| 5,626,401 A * | 5/1997 | Terry et al. | 301/59 |
| 5,738,197 A | 4/1998 | Kroger et al. | |
| 5,757,084 A * | 5/1998 | Wagner | 301/105.1 |
| 5,909,931 A * | 6/1999 | Tabe | 301/110.5 |
| 5,979,924 A | 11/1999 | D'Aluisio et al. | |
| 5,980,116 A * | 11/1999 | Chiang | 384/545 |
| 5,997,104 A | 12/1999 | Campagnolo | |
| 6,212,774 B1 | 4/2001 | Ohtsu | |
| 6,260,681 B1 * | 7/2001 | Chen | 301/110.5 |
| 6,371,252 B1 | 4/2002 | Kanehisa | |
| 6,386,644 B1 * | 5/2002 | Chen | 301/110.5 |
| 6,511,133 B1 * | 1/2003 | Tabe | 301/59 |
| 6,523,659 B1 * | 2/2003 | Kanehisa et al. | 301/110.5 |
| 6,544,140 B1 * | 4/2003 | Gradu et al. | 475/246 |
| 6,557,684 B1 * | 5/2003 | Jager et al. | 301/110.5 |
| 6,669,306 B1 * | 12/2003 | Hara et al. | 301/110.5 |
| 6,783,192 B1 * | 8/2004 | Meggiolan | 301/110.5 |
| 2002/0017819 A1 | 2/2002 | Chen | |
| 2003/0198419 A1 * | 10/2003 | Chen | 384/545 |
| 2004/0165805 A1 * | 8/2004 | Kanehisa et al. | 384/545 |

FOREIGN PATENT DOCUMENTS

CH 398199 8/1965

(Continued)

OTHER PUBLICATIONS

U.S. Appl. No. 10/002,256 for Seal Assembly for a Bicycle Bottom Bracket; Inventor—Masahiro Yamanaka; filed Nov. 23, 2001.

*Primary Examiner*—Jason R. Bellinger
(74) *Attorney, Agent, or Firm*—Global IP Counselors

(57) ABSTRACT

A bicycle hub is provided with a hub axle, a hub shell and a pair of bearing units. Each of the bearing units has an inner race supported on one axle end of the hub axle, an outer race threadedly coupled to an inner tubular surface of the hub shell, and a plurality of first rolling members disposed between the inner and outer races. Preferably, a first stopper ring is coupled to one of the first inner and outer races to form an axial abutment that is arranged to contact the other of the first inner and outer races to prevent axial separation of the first inner and outer races prior to installation of the bearing unit between the hub axle and the hub shell.

20 Claims, 16 Drawing Sheets

FOREIGN PATENT DOCUMENTS

| | | |
|---|---:|---:|
| DE | 102838 | 4/1899 |
| DE | 838860 | 5/1952 |
| FR | 992460 | 10/1951 |
| GB | 191308211 | 0/1914 |
| GB | 264693 | 1/1927 |
| JP | 50-6040 A | 1/1975 |
| JP | 58-157804 U | 10/1983 |
| JP | 59-106702 | 7/1984 |
| JP | 59-122901 U | 8/1984 |
| JP | 02-081703 | 3/1990 |

\* cited by examiner

BICYCLE HUB

BACKGROUND OF THE INVENTION

1. Field of the Invention

The present invention generally relates to a bicycle hub. More specifically, the present invention relates to a bicycle hub with an improved bearing assembly.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle as well as the frame of the bicycle. One of the most important aspects of a bicycle is how well the wheels rotate relative to the bicycle frame. Thus, it is important to construct wheels that are inexpensive and easy to assembly, while maintaining good performance.

The wheel on a bicycle usually includes a rim with a tire coupled to a hub by a plurality of spokes. The hub has a hub shell rotatably supported on an axle by a pair of bearing assemblies. Thus, the axle is fixed to the bicycle frame and a hub shell that is rotatably supported on the axle. The spokes are coupled between the hub shell and the rim. Typically, the rim is linked to the hub shell by spoke nipples that thread onto the radially outward ends of the spokes. However, recently, some bicycle wheel designs have reversed the spoke arrangement so that each of the spokes has an outer portion secured to the rim and a threaded end secured to the hub shell. The inner end can be secured to the hub shell via conventional spoke nipples. The conventional spoke nipples typically include a head portion and an internally threaded shaft portion.

The bicycle hub must be capable of withstanding static and dynamic loads while permitting the wheels to rotate smoothly and easily. Thus, the hub is probably the most important part of the bicycle wheel. If the bearings of the hub are installed incorrectly, the wheel may not rotate smoothly and easily. For example, if too much axial compression is applied to the bearing, then the bearings will not rotate smoothly. Also, when the bearings of the hub become worn, the wheel will not rotate smoothly and easily. Typically, the bearings of the hub are installed in the ends of the hub shell by press-fitting them into the central passageway of the hub shell. Since hub shells are often made of aluminum, the bearings cannot be removed without damaging the hub shell. Thus, when the bearings wear out, the entire hub is usually replaced.

In view of the above, it will be apparent to those skilled in the art from this disclosure that there exists a need for a bicycle hub with an improved bear assembly. This invention addresses this need in the art as well as other needs, which will become apparent to those skilled in the art from this disclosure.

SUMMARY OF THE INVENTION

One object of the present invention is to provide a bicycle hub, which has superior transmission performance but which has a simple structure.

Another object of the present invention is to provide a bicycle hub with a bearing unit that can be easily replaced without damaging the hub shell.

Yet another object of the present invention is to provide a bicycle hub with a bearing unit that is easy to install as a single unit.

Another object is to provide a high quality bicycle hub that is relatively easy to produce at a reasonable price.

One aspect of the present invention can basically be attained by providing a bicycle hub comprising a hub axle, a hub shell, a first bearing unit and a second bearing unit. The hub axle has a first axle end and a second axle end with a center axis extending between the first and second axle ends. The hub shell has a first shell end and a second shell end with an inner tubular surface forming a central passage extending between the first and second shell ends. The hub axle is disposed within the central passage of the hub shell. The first bearing unit is disposed between the first axle end of the hub axle and the first shell end of the hub shell to rotatably support the first shell end of the hub shell on the first axle end of the hub axle. The first bearing unit includes a first inner race supported on the first axle end of the hub axle, a first outer race threadedly coupled to the inner tubular surface of the hub shell, and a plurality of first rolling members disposed between the first inner race and the first outer race. The second bearing unit is disposed between the second axle end of the hub axle and the second shell end of the hub shell to rotatably support the second shell end of the hub shell on the second axle end of the hub axle.

Another aspect of the present invention can basically be attained by providing a bicycle hub comprising a hub axle, a hub shell, a first bearing unit and a second bearing unit. The hub axle has a first axle end and a second axle end with a center axis extending between the first and second axle ends. The hub shell has a first shell end and a second shell end with an inner tubular surface forming a central passage extending between the first and second shell ends. The hub axle is disposed within the central passage of the hub shell. The first bearing unit is disposed between the first axle end of the hub axle and the first shell end of the hub shell to rotatably support the first shell end of the hub shell on the first axle end of the hub axle. The first bearing unit includes a first inner race supported by the first axle end of the hub axle, a first outer race supported by the inner tubular surface of the hub shell, a plurality of first rolling members disposed between the first inner race and the first outer race, and a first stopper ring coupled to one of the first inner and outer races to form an axial abutment that is arranged to contact the other of the first inner and outer races to prevent axial separation of the first inner and outer races prior to installation of the first bearing unit between the hub axle and the hub shell. The second bearing unit is disposed between the second axle end of the hub axle and the second shell end of the hub shell to rotatably support the second shell end of the hub shell on the second axle end of the hub axle.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
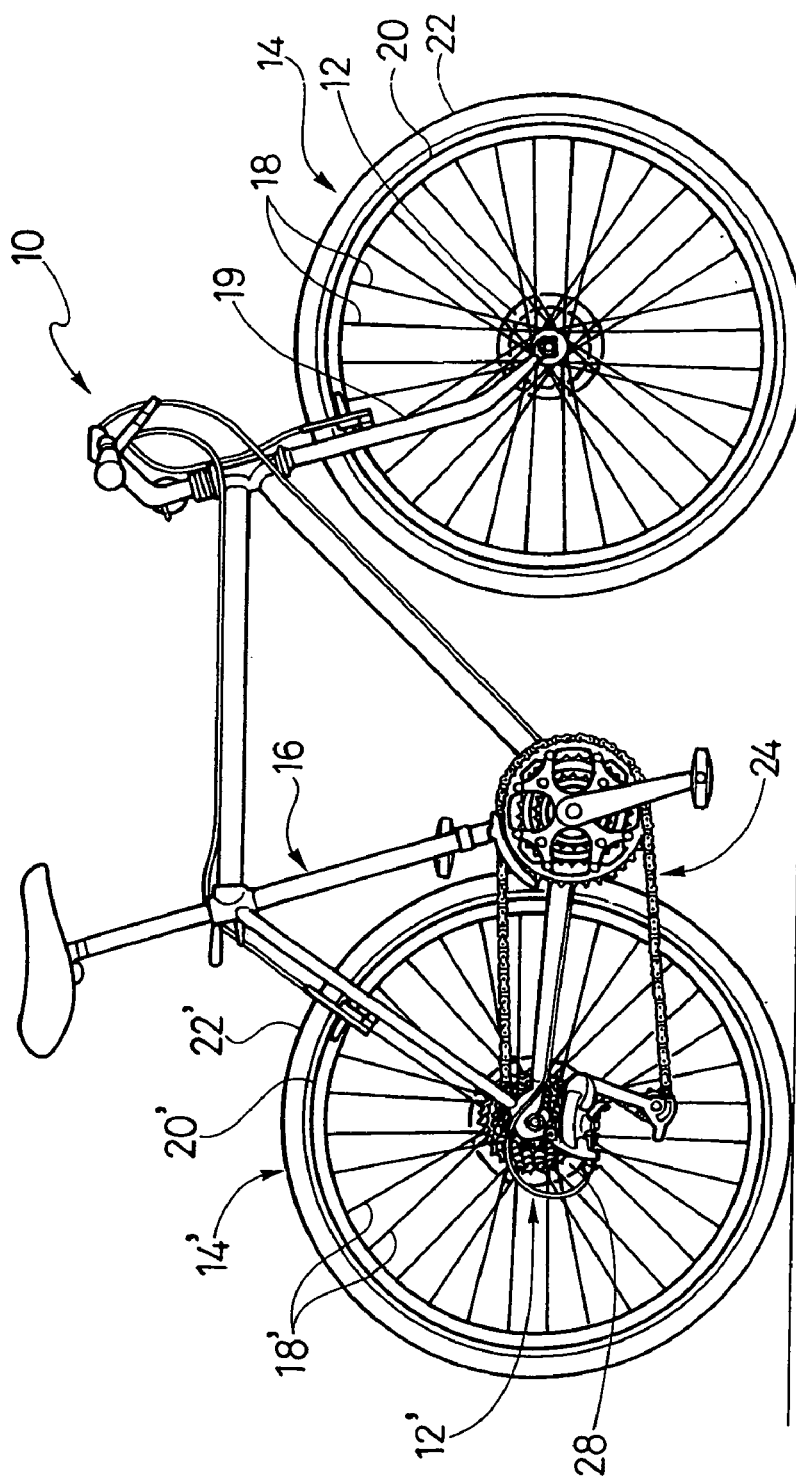
FIG. 1 is a side elevational view of a conventional bicycle with front and rear bicycle hubs in accordance with preferred embodiments of the present invention.

Referring initially to FIG. 1, a bicycle 10 is illustrated with a front bicycle hub 12 and a rear hub 12' in accordance with a first embodiment of the present invention. The rear bicycle hub 12' is part of a rear wheel 14' that is rotatably coupled to a rear fork section of a bicycle frame 16, while the front hub 12 is part of a front wheel 14 that is rotatably coupled to a front fork 19 that is movably coupled to the bicycle frame 16. In particular, the front wheel 14 has a plurality of spokes 18 extending outwardly the front bicycle hub 12 to an annular front rim 20. The spokes 18 are coupled to the front rim 20 by spoke nipples (not shown) such that the tension in the spokes 18 can be adjusted in a conventional manner. A pneumatic tire 22 is mounted on the outer surface of the front rim 20 in a conventional manner. Similarly, the rear wheel 14' has a plurality of spokes 18' extending outwardly the rear bicycle hub 12' to an annular rear rim 20'. The spokes 18' are coupled to the rear hub 20' by spoke nipples (not shown) such that the tension in the spokes 18' can be adjusted. A pneumatic tire 22' is mounted on the outer surface of the rear rim 20' in a conventional manner. The bicycle 10 also includes a drive train 24 for propelling the bicycle 10 in a conventional manner.

In the illustrated embodiment, each of the front and rear wheels 14 and 14' has thirty-two spokes. Of course, it will be apparent to those skilled in the art from this disclosure that the front and rear wheels 14 and 14' can have fewer or more of the spokes than illustrated, if needed and/or desired. Each of the spokes 18 and 18' has an outer threaded end or spoke head coupled to the rim 20 or 20' by a spoke nipple and an inner bent end coupled to the bicycle hub 12 or 12' in a conventional manner. Thus, the outer ends of the spokes 18 and 18' are threadedly coupled to the spoke nipples to adjust the tension in the spokes 18 and 18'.

The rims 20 and 20' are constructed of a substantially rigid material, such as those materials, which are well known in the art. For example, the rims 20 and 20' can be constructed of any suitable metallic material, such as plated steel, stainless steel, aluminum, magnesium or titanium, as well as other non-metallic materials, such as a carbon fiber composite, which can be utilized for a bicycle wheel. The rims 20 and 20' are relatively conventional. Therefore, the rims 20 and 20' will not be discussed or illustrated in detail herein.

Moreover, since most of the parts of the bicycle 10 are well known in the art, the parts of the bicycle 10 will not be discussed or illustrated in detail herein, except for the parts relating to the hubs 12 and 12' of the present invention. Moreover, various conventional bicycle parts such as brakes, derailleurs, additional sprocket, etc., which are not illustrated and/or discussed in detail herein, can also be used in conjunction with the present invention.

Front Hub 12

Figure 2:
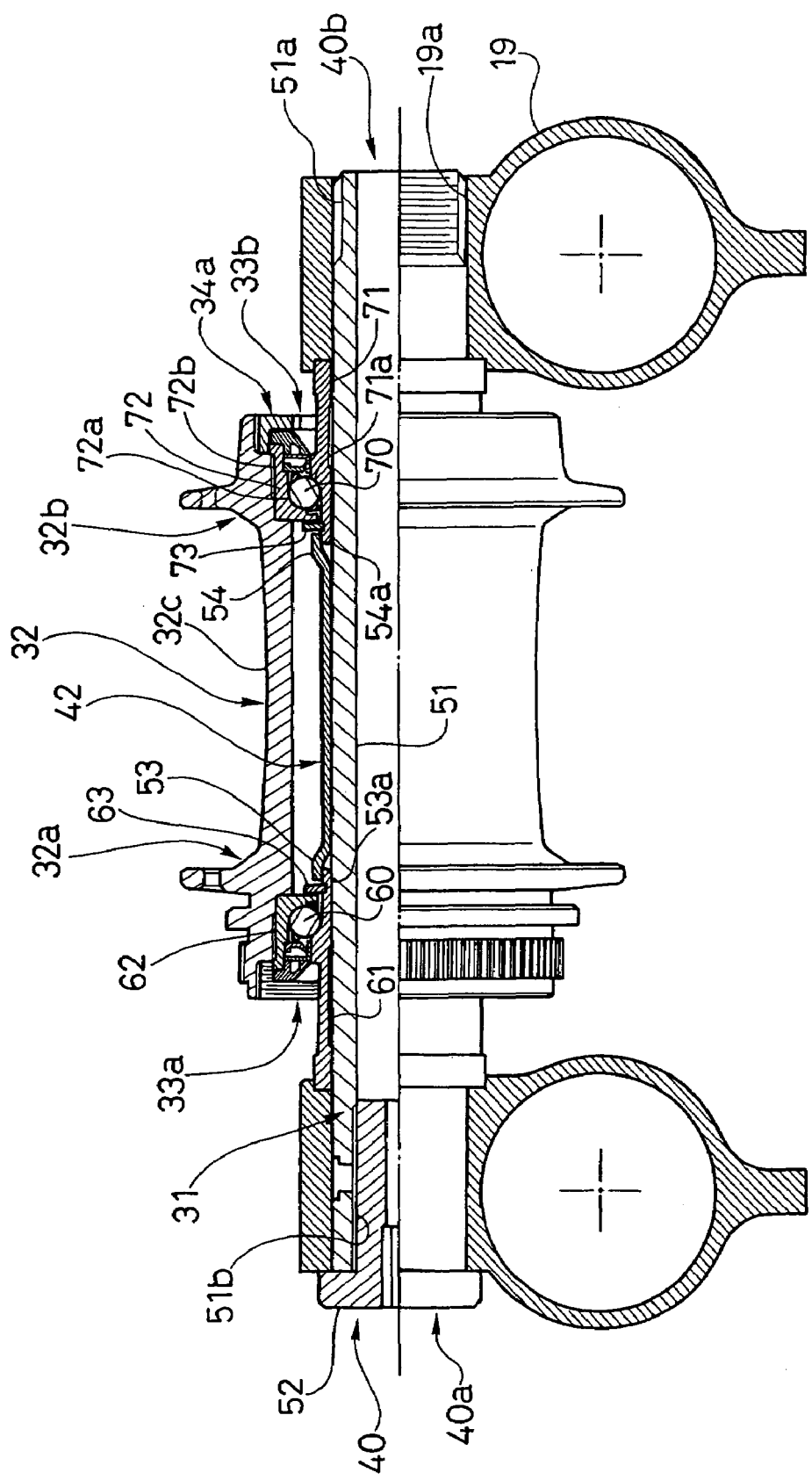
FIG. 2 is an elevational view of the front bicycle hub illustrated in FIG. 1, with the top half shown in cross-section, in accordance with a first embodiment of the present invention.

Referring now to FIGS. 2–20, the front hub 12 basically includes a hub axle assembly 31, a hub shell 32 and a pair of bearings 33a and 33b. The bearings 33a and 33b are threaded into opposite ends of the hub shell 32 to rotatably support the hub shell 32 on the hub axle assembly 31 as explained below. Optionally, a disc brake rotor (not shown) can be attached to the bicycle hub 12 by a retaining or locking ring on the left side of the hub shell 32 such as disclosed in U.S. Pat. No. 6,371,252 to Kanehisa (Assigned to Shimano, Inc.). In FIG. 2, the locking ring is not installed on the left end of the hub shell 32 for purposes of illustration. However, a locking ring 34a (FIGS. 21 and 22) is installed on the right end of the hub shell 32.

Figure 6:
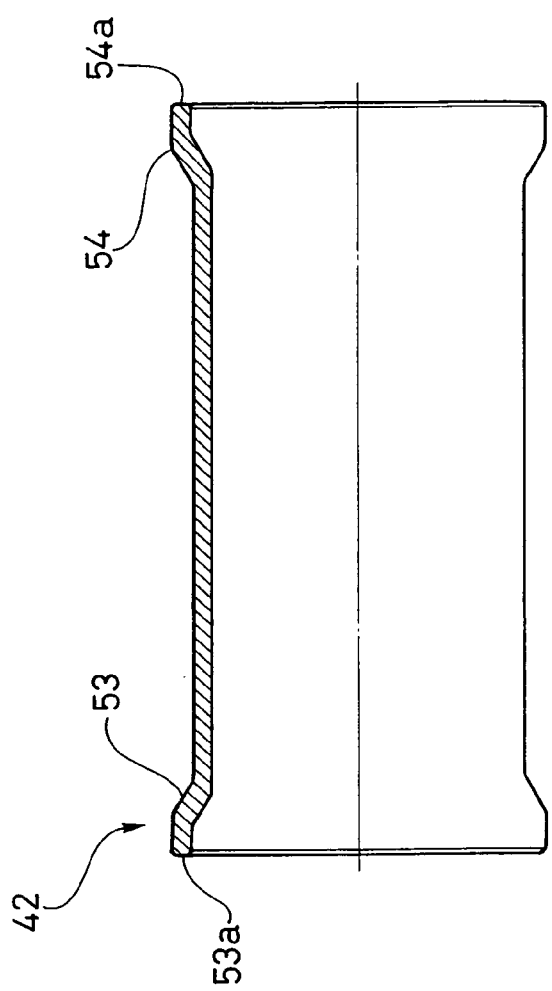
FIG. 6 is an elevational view of the axle pipe or bearing spacer for the bearing units of the front bicycle hub illustrated in FIG. 2, with the top half shown in cross-section, in accordance with the first embodiment of the present invention.
Figure 7:
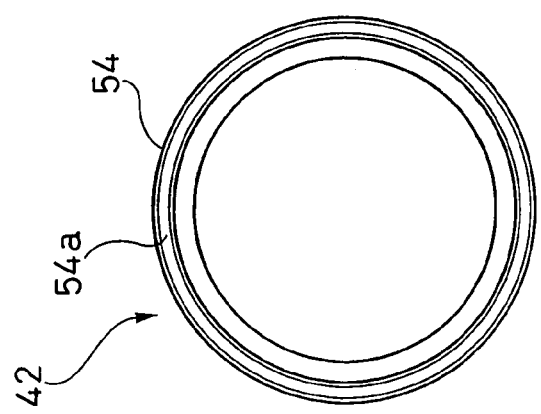
FIG. 7 is a right end elevational view of the axle pipe or bearing spacer illustrated in FIG. 6 for the bearing units of the front bicycle hub illustrated in FIG. 2 in accordance with the first embodiment of the present invention.

As best seen in FIG. 2, the hub axle assembly 31 basically includes a hub axle or spindle 40 (FIG. 2) and an axle pipe or bearing spacer 42 (FIGS. 6 and 7). The hub axle assembly 31 rotatably supports the hub shell 32 via the bearings 33a and 33b. As best seen in FIG. 2, the hub axle 40 includes a hard, rigid tubular member 51 and a fastening bolt 52. The tubular member 51 includes external threads 51a at the right end and internal threads 51b at the left end for threadedly receiving the fastening bolt 52. The external threads 51a are threaded into a hole 19a of the front fork 19 of the bicycle frame 16. The fastening bolt 52 contacts the front fork 19 of the bicycle frame 16 to secure the hub axle assembly 31 thereto. It will be apparent to those skilled in the art from this disclosure that the hub axle 40 can be constructed as a one-piece, unitary member. In other words, it will be apparent to those skilled in the art from this disclosure that the tubular member 51 and a fastening bolt 52 can be constructed together as a one-piece, unitary member Still referring to FIGS. 2, the bearing spacer 42 is a tubular member that is concentrically mounted on the tubular member 51 of the hub axle 40. The bearing spacer 42 has first and second axle ends 53 and 54 that contact the inner ends of the bearings 33a and 33b, respectively. The bearing spacer 42 assists in the assemble of the hub axle 40. Preferably, the free ends 53 and 54 of the bearing spacer 42 are step-shaped to overlap inner end portions of the bearings 33a and 33b. The free ends 53 and 54 of the bearing spacer 42 have annular abutment surfaces 53a and 54a that face in opposite axial directions.

Figure 5:
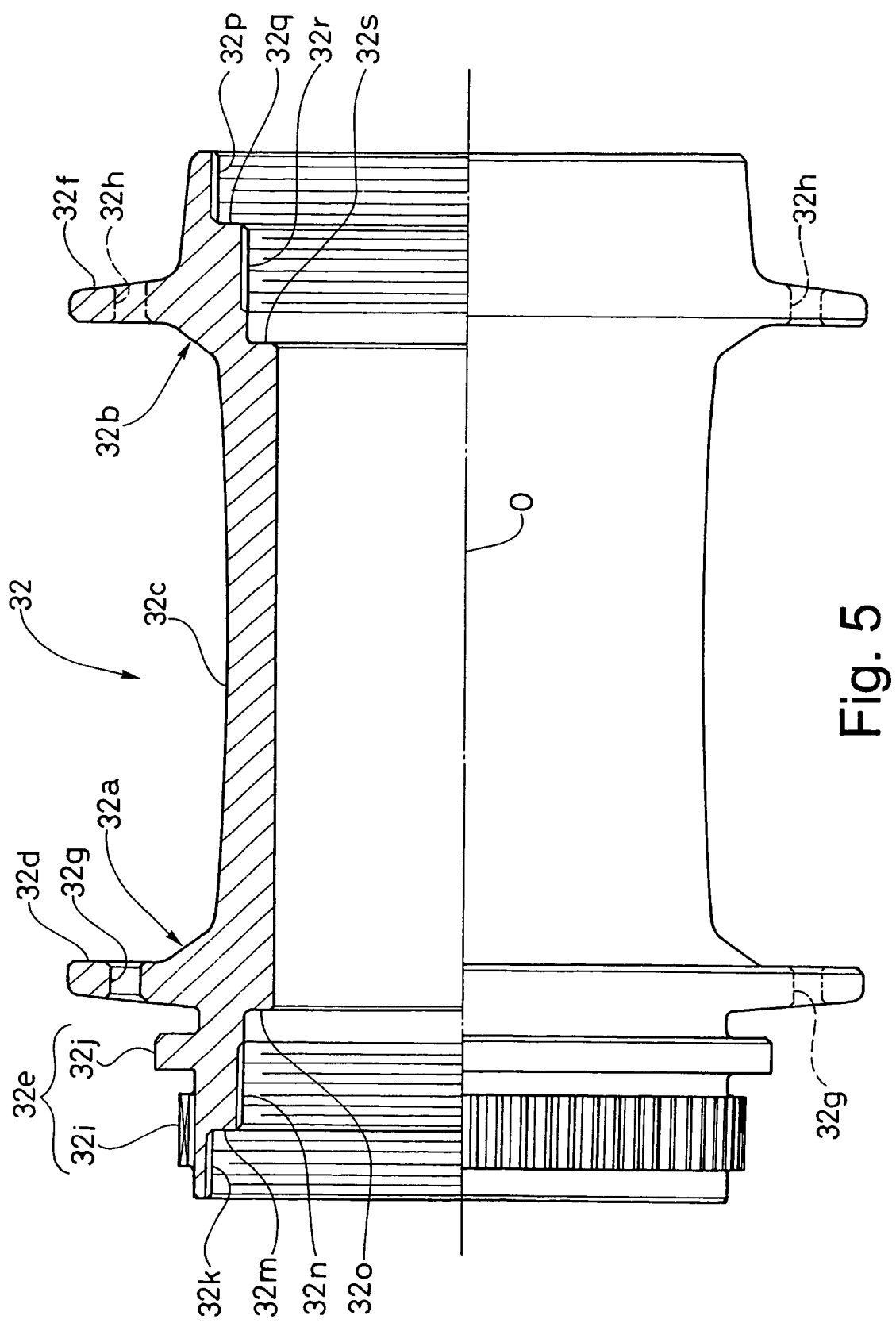
FIG. 5 is an elevational view of the front hub shell for the front bicycle hub illustrated in FIG. 2, with the top half shown in cross-section, in accordance with the first embodiment of the present invention.

Turning now to FIGS. 2 and 5, the hub shell 32 will now be described. Preferably, the hub shell 32 is preferably formed as a one-piece, unitary member. It will be apparent to those skilled in the art from this disclosure that the hub shell 32 can be constructed of any substantially rigid material, such as those materials, which are known in the art. For example, the hub shell 32 can be constructed of any suitable metallic material, such as plated steel, stainless steel, aluminum, magnesium or titanium, as well as other non-metallic materials, such as carbon fiber composite, ceramic or plastic. Of course, the hub shell 32 could be constructed of several pieces of various different materials as need and/or desired.

Referring to FIG. 5, the hub shell 32 has a first or left shell end 32a and a second or right shell end 32b with a center tubular portion 32c located therebetween. The first and second hub shell ends 32a and 32b are integral formed with the center tubular portion 32c as a one-piece, unitary member. The hub shell 32 is a tubular member having an inner tubular surface forming a central interior passage extending between the first and second shell ends 32a and 32b. The hub axle 40 is disposed within the central interior passage of the hub shell 32. The first and second bearings 33a and 33b rotatably support the hub shell 32 on the hub axle 40 for rotating the hub shell 32 relative to the hub axle 40.

The first shell end 32a has a first spoke attachment portion or flange 32d and a brake rotor attachment portion 32e, while the second shell end 32b has a second spoke attachment portion or flange 32f. The first spoke flange 32d is preferably an annular member with a plurality of first spoke holes 32g (e.g., sixteen in the illustrated embodiment but only two shown in FIG. 5). In this embodiment, the first spoke holes 32g are equally spaced apart about the imaginary circle that is centered on the axis O. The first spoke holes 32g are arranged to receiving the bent ends of the spokes 18. Similarly, the second spoke flange 32f is preferably an annular member with a plurality of second spoke holes 32h in the second spoke flange 32f for receiving the bent ends of the spokes 18. The second spoke holes 32h are equal in number to the number of the first spoke holes 32g. The second spoke holes 32h are circumferentially offset relative to the first spoke holes 32g such that the first and second spoke holes 32g and 32h are not axially aligned. In the illustrated embodiment, the second spoke holes 32h are equally spaced apart about the imaginary circle that is centered on the center axis O of the hub axle assembly 31. Thus, the rim 20 is coupled to the first and second spoke flanges 32d and 32f via the spokes 18. Accordingly, the bicycle hub 12 is designed to have the spokes 18 extending outwardly from the first and second spoke flanges 32d and 32f in a generally tangential direction.

The first and second spoke attachment portions 32a and 32b and the brake rotor attachment portion 32e are integrally formed with the hub shell 32 as a one-piece, unitary member. In particular, the first hub shell end 32a has the first spoke flange 32d and the brake rotor attachment portion 32e integrally mounted thereon, while the second hub shell end 32b has the second spoke flange 32f integrally mounted thereon.

The brake rotor attachment portion 32e is integrally formed with the first hub shell end 32a of the hub shell 32 as a one-piece, unitary member. The brake rotor attachment portion 32e is also disposed at the first hub shell end 32a adjacent the first spoke flange 32d. The brake rotor attachment portion 32e is a tubular member, which has a tubular section with an external splines 32i and an annular abutment flange 32j extending outwardly from the tubular section in a radial direction. The annular abutment flange 32j is spaced from the free end of the tubular section of the brake rotor attachment portion 32e. The tubular section of the brake rotor attachment portion 32e also has an annular internal surface with a first set of internal threads 32k. The axially extending external splines 32i of the brake rotor attachment portion 32e non-rotatably engage a disc brake rotor (not shown). The internal threads 32k of the brake rotor attachment portion 32e threadedly engage a locking ring. Thus, a disc brake rotor can be non-rotatably secured to the brake rotor attachment portion 32e by the locking ring. This locking ring will also aid in preventing the first bearing 33a from unthreading from the hub shell 32.

At the left end of the hub shell 32, the inner tubular surface of the hub shell 32 further includes a first step shaped end portion having the first set of internal threads 32k, a first axial abutment surface 32m, a second set of internal threads 32n and a second axial abutment surface 32o. The internal threads 32n fixedly secure the first bearing 33a to the first shell end 32a as explained below. Preferably, the internal threads 32k are right-hand threads, while the internal threads 32n are left-hand threads.

Figure 21:
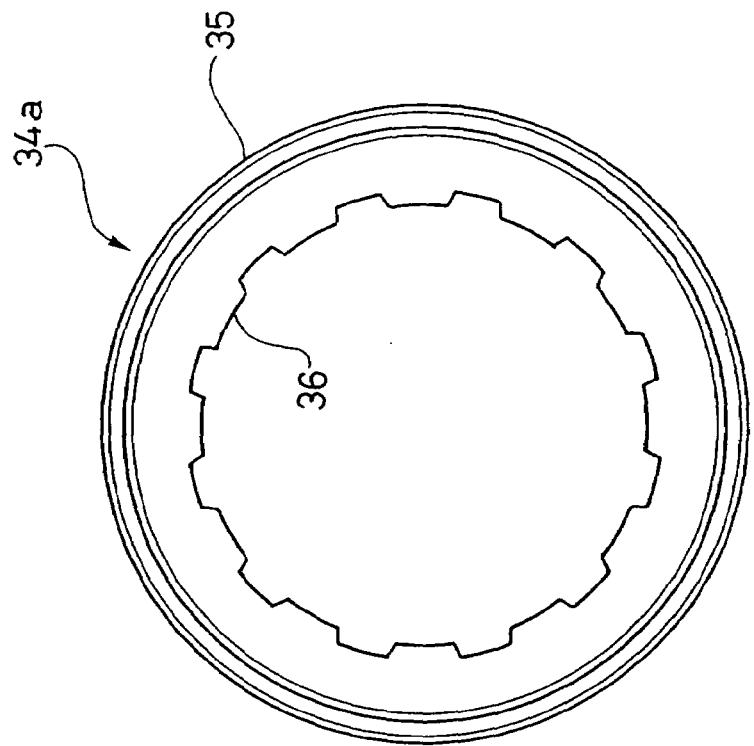
FIG. 21 is an outside or left end elevational view of the locking ring for the left bearing unit of the front hub illustrated in FIG. 2 in accordance with the first embodiment of the present invention.
Figure 22:
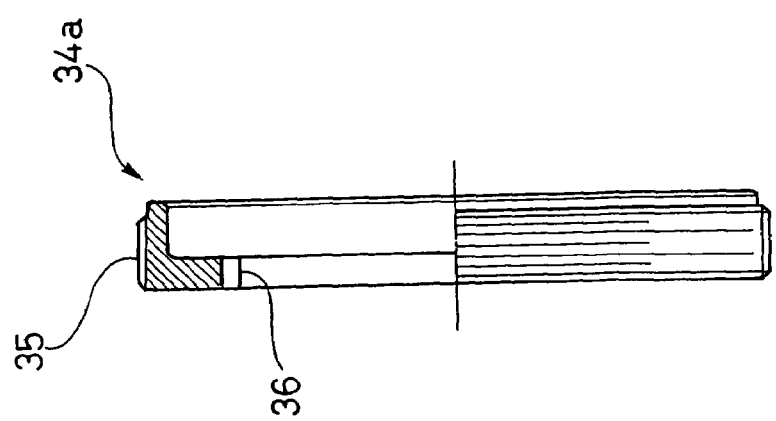
FIG. 22 is an elevational view of the locking ring illustrated in FIG. 21 for the left bearing unit of the front hub illustrated in FIG. 2, with the top half shown in cross-section, in accordance with the first embodiment of the present invention.

At the right end of the hub shell 32, the inner tubular surface of the hub shell 32 includes a second step shaped portion having a first set internal threads 32p, a first axial abutment surface 32q, a set of second internal threads 32r and a second axial abutment surface 32s. The first internal threads 32p of the second shell end 32b threadedly receive the locking ring 34a (FIGS. 2, 21 and 22). The second internal threads 32r fixedly secure the second bearing 33b to the second shell end 32b. Preferably, the internal threads 32p are right-hand threads, while the internal threads 32r are left-hand threads.

Figure 3:
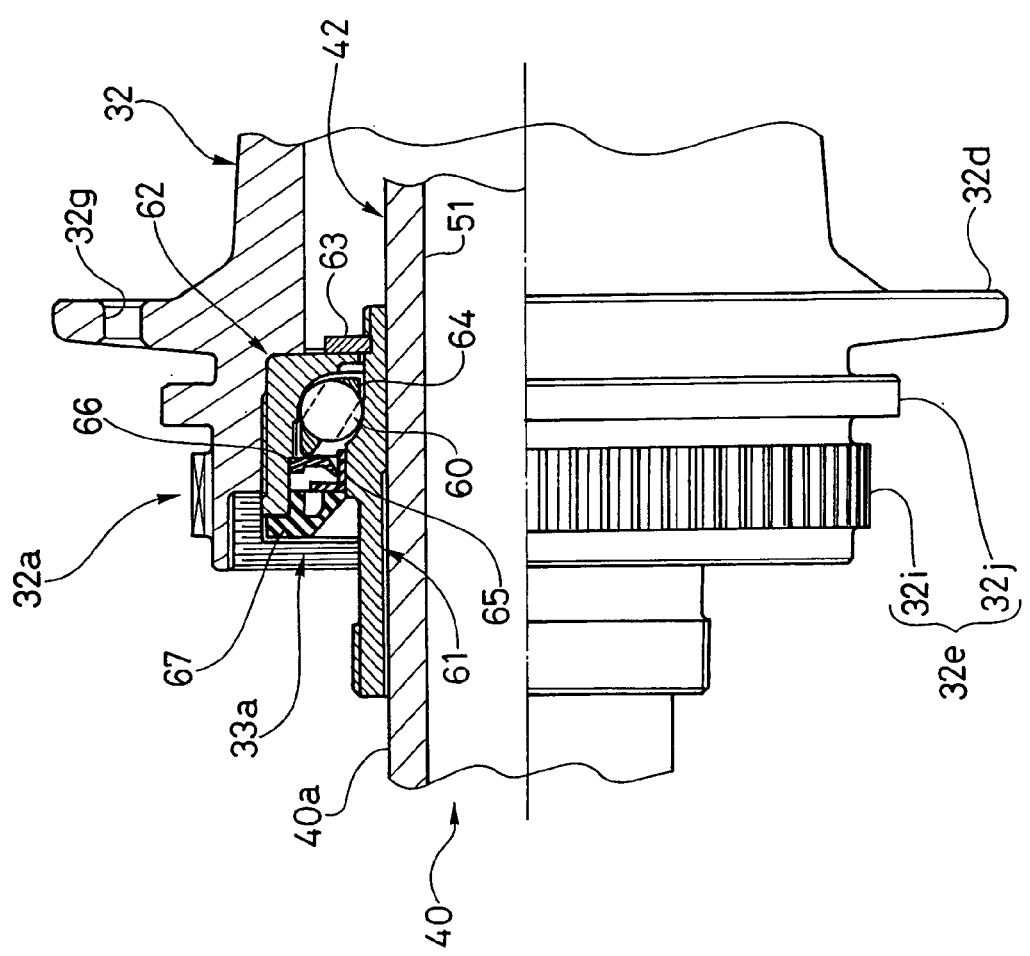
FIG. 3 is an elevational view of the left end of the front bicycle hub illustrated in FIG. 2, with the top half shown in cross-section, in accordance with the first embodiment of the present invention.
Figure 4:
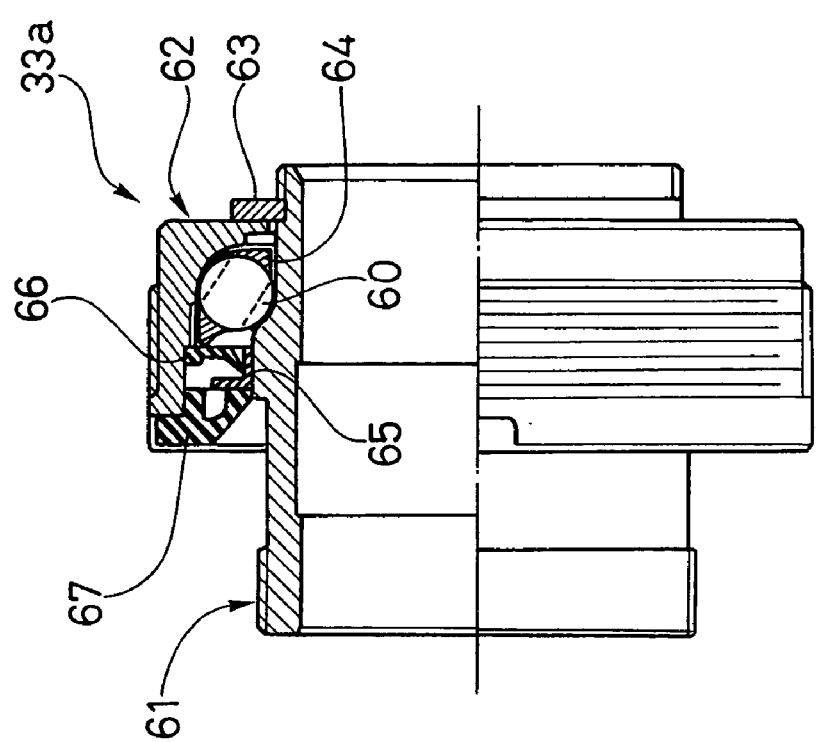
FIG. 4 is an elevational view of the left bearing unit for the front bicycle hub illustrated in FIG. 2, with the top half shown in cross-section, in accordance with the first embodiment of the present invention.

As mentioned above, the first and second bearings 33a and 33b rotatably support the hub shell 32 relative to both the hub axle 40 and the bearing spacer 42. Referring now to FIGS. 3 and 4, the first bearing 33a will now be discussed in more detail. The second bearing 33b is substantially identical to bearing 33a, but installed on the opposite side of the hub 12. Thus, only the first bearing 33a will be described and illustrated in detail herein.

The first bearing 33a is disposed between the first axle end 40a of the hub axle 40 and the first shell end 32a of the hub shell 32 to rotatably support the first shell end 32a of the hub shell 32 on the first axle end 40a of the hub axle 40. The first or left side bearing 33a basically includes a plurality of first rolling members or balls 60 disposed between a first inner race or cone 61 supported on the first axle end 40a of the hub axle 40 and a first outer race or cup 62 threadedly coupled to the internal threads 32n of the first shell end 32a of the hub shell 32. The first inner and outer races 61 and 62 and the balls 60 are held together as a single bearing unit by a split snap ring or stopper ring 63. The first bearing 33a further includes a ball bearing retainer 64, an inner seal 65, a seal ring 66 and an outer rubber seal 67. Parts 64, 65, 66 and 67 are relatively conventional parts, and thus, these parts will not be discussed in detail herein.

Figure 8:
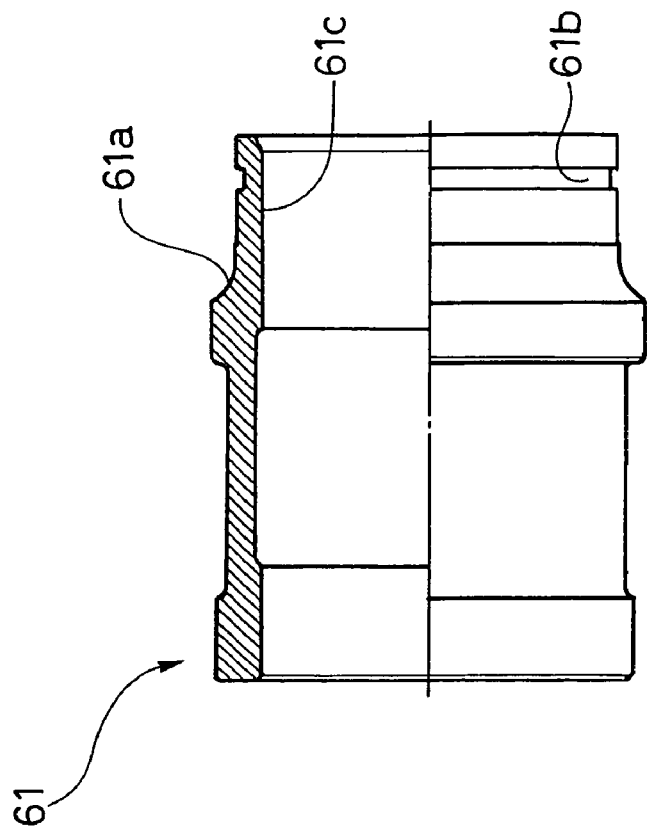
FIG. 8 is an elevational view of the inner race or cone for the left bearing unit of the front bicycle hub illustrated in FIG. 2, with the top half shown in cross-section, in accordance with the first embodiment of the present invention.
Figure 9:
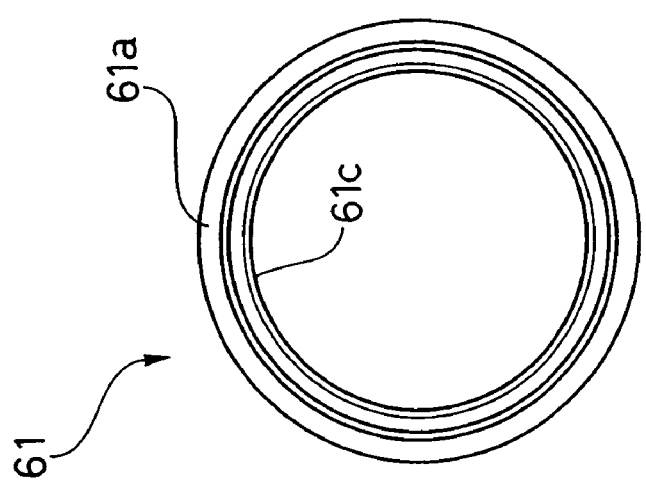
FIG. 9 is an inside or right end elevational view of the inner race illustrated in FIG. 8 for the left bearing unit of the front bicycle hub illustrated in FIG. 2 in accordance with the first embodiment of the present invention.

As seen in FIGS. 8 and 9, the first inner race 61 is a cone that includes a first outer angular bearing surface 61a that axially and radially contacts the first rolling members 60 such that the first outer angular bearing surface 61a contacts and supports each of the first rolling members 60 at an inner peripheral area and an axial facing area. The first outer angular bearing surface 61a faces generally outwardly and towards the second axle end 32b of the hub shell 32. The outer peripheral surface of the first inner race 61 also has an annular recess or groove 61b for receiving the stopper ring 63 therein. In other words, the stopper ring 63 is radially expanded so as just snap into the groove 61b of the first inner race 61. The inner race 61 further includes a step-shaped bore 61c with a minimum diameter that is sized such that the inner race 61 can slide onto the outer peripheral surface of the tubular member 51 of the axle 40.

Figure 10:
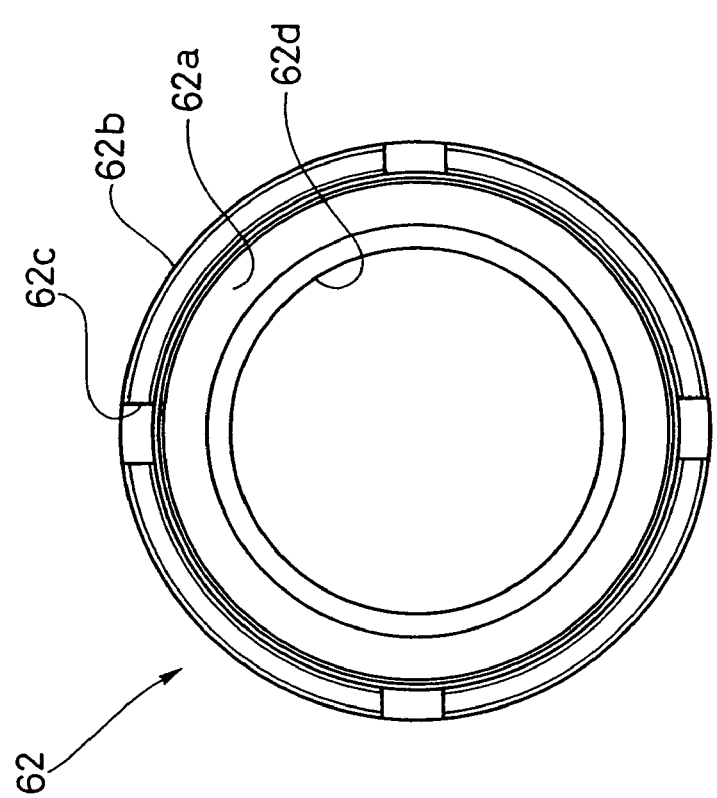
FIG. 10 is an outside or left end elevational view of the outer race or cup for the left bearing unit of the front bicycle hub illustrated in FIG. 2 in accordance with the first embodiment of the present invention.
Figure 11:
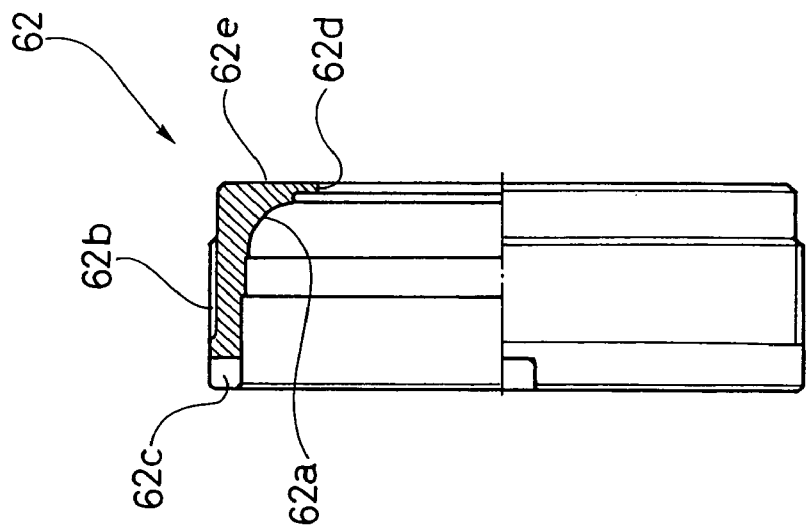
FIG. 11 is an elevational view of the outer race or cup illustrated in FIG. 10 for the left bearing unit of the front bicycle hub illustrated in FIG. 2, with the top half shown in cross-section, in accordance with the first embodiment of the present invention.
Figure 12:
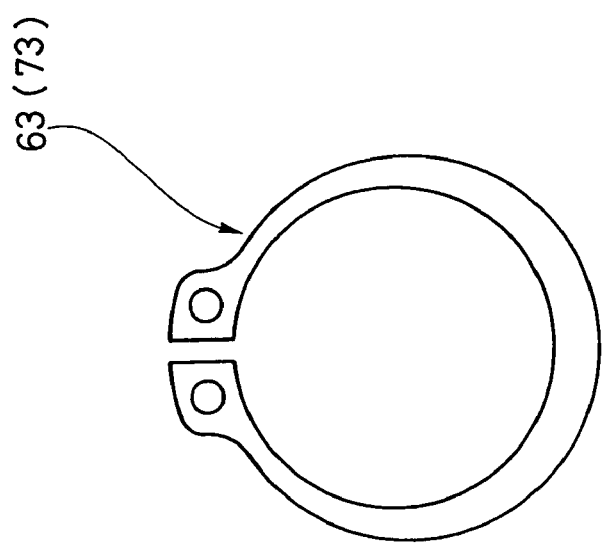
FIG. 12 is an elevational view of the stopper ring or member for the left bearing unit of the front bicycle hub illustrated in FIG. 2 in accordance with the first embodiment of the present invention.

As seen in FIGS. 10 and 11, the first outer race 62 is a cup that includes a first inner angular bearing surface 62a that axially and radially contacts the first rolling members 60 on a side that is opposite from the first outer angular bearing surface 61a such that the first inner angular bearing surface 62a contacts and supports each of the first rolling members 60 at an outer peripheral area and an axial facing area. The first inner angular bearing surface 62a faces generally inwardly and away from the second axle end 32b of the hub shell 32. The first outer race 62 also has a first outer peripheral surface with first external threads 62b that are threadedly engaged with first internal threads 32n formed on the inner tubular surface of the hub shell 32. The first outer race or cup 62 also has four notches 62c at one of its axial ends for receiving a tool to install the first outer race 62 into the hub shell 32. The other axial end of the first outer race 62 has an opening 62d that is sized to receive a portion of the first inner race 61 therethrough. Finally, the axial end of the first outer race 62 with the opening 62d also has an axially facing abutment surface 62e that contacts the axial abutment surface 32o of the hub shell 32.

Figure 13:
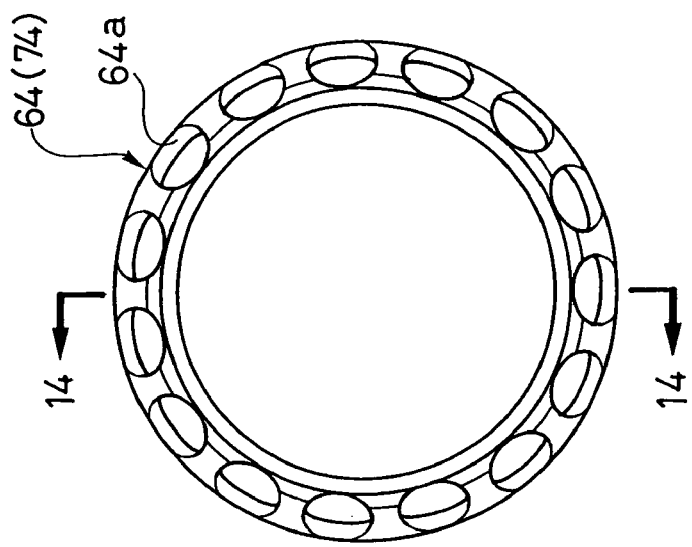
FIG. 13 is an inside end elevational view of the ball bearing retainer for the left bearing unit of the front bicycle hub illustrated in FIG. 2 in accordance with the first embodiment of the present invention.
Figure 14:
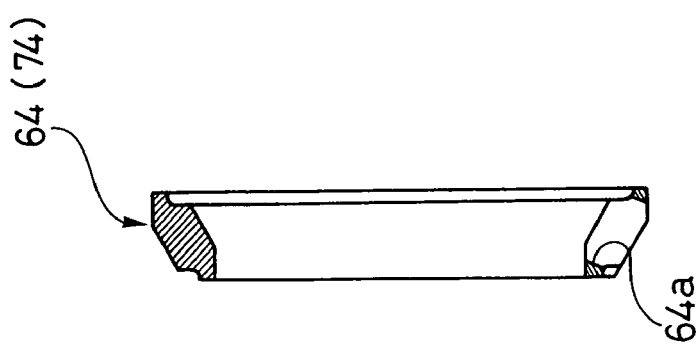
FIG. 14 is a longitudinal cross-sectional view of the ball bearing retainer as seen along section line 14—14 of FIG. 13.

As seen in FIGS. 13 and 14, the ball bearing retainer 64 has a plurality of openings 64a that are dimension for receiving and retaining one of the roller members or balls 60 therein. The ball bearing retainer 64 is preferably constructed of a hard rigid material such as metallic material. Moreover, the ball bearing retainer 64 is preferably one-piece unitary member.

Figure 15:
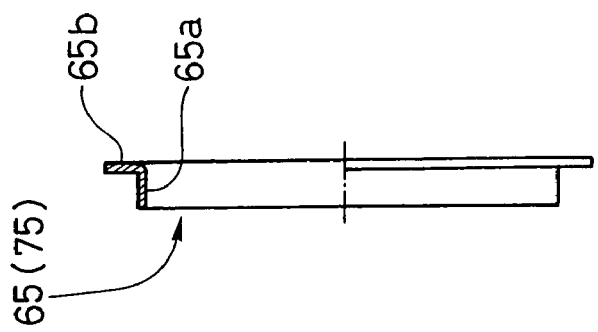
FIG. 15 is an elevational view of the inner seal for the left bearing unit of the front bicycle hub illustrated in FIG. 2, with the top half shown in cross-section, in accordance with the first embodiment of the present invention.

Referring now to FIG. 15, the inner seal 65 has an L-shaped cross section with a first axially extending portion 65a and a second radially extending portion 65b. Preferably, the inner seal 65 is constructed of a rigid metallic material, and is constructed as one-piece unitary member.

Figure 16:
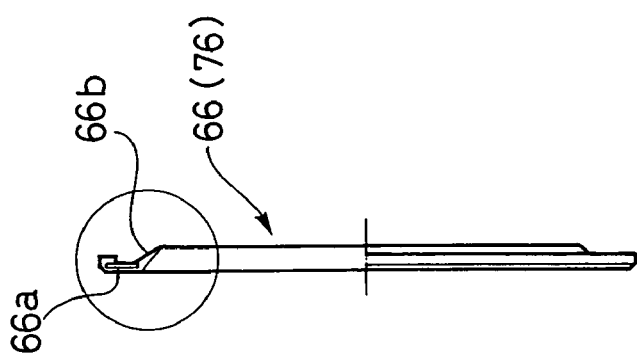
FIG. 16 is an elevational view of the seal ring for the left bearing unit of the front bicycle hub illustrated in FIG. 2, with the top half shown in cross-section, in accordance with the first embodiment of the present invention.
Figure 17:
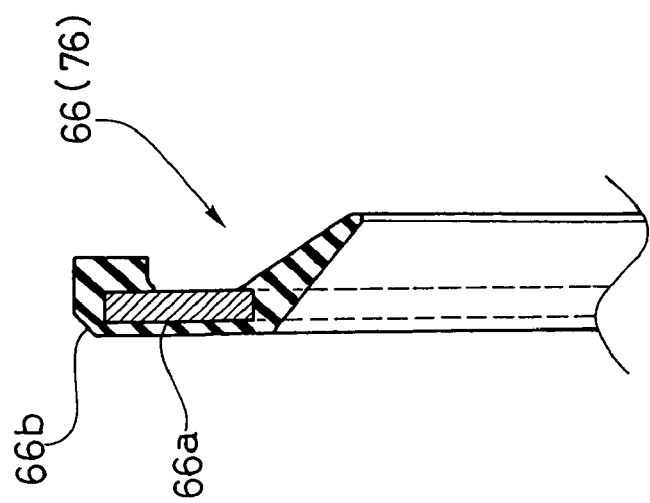
FIG. 17 is a partial longitudinal cross-sectional view of the circled portion of the seal ring illustrated in FIG. 16.

As seen in FIGS. 16 and 17, the inner seal 66 is preferably constructed of two pieces. In particular, the seal ring 66 has a circular washer 66a constructed of a rigid metallic material embedded in an elastomeric sealing portion 66b. The elastomeric sealing portion 66b is sized to contact the inner peripheral surface of the first outer race 62 and the axially extending portion 65a of the inner seal 65.

Figure 18:
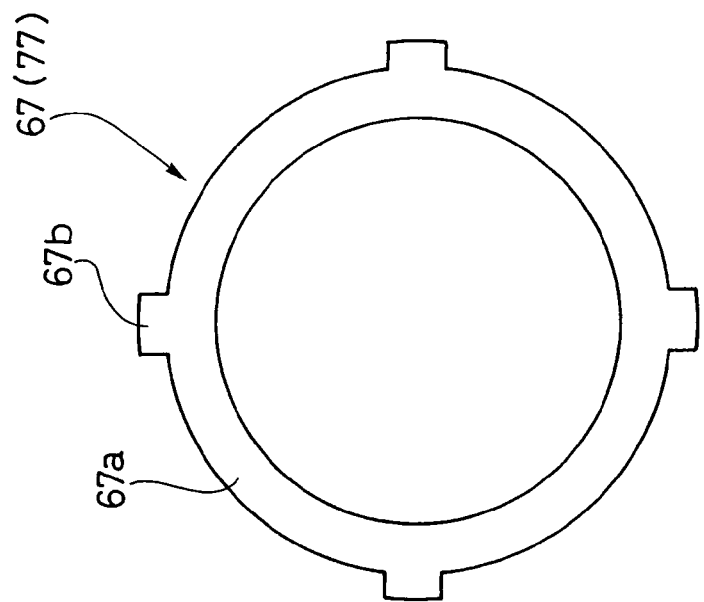
FIG. 18 is an outside end elevational view of the outer rubber seal illustrated in FIG. 12 for use with the bearing assemblies of the front bicycle hub illustrated in FIG. 2 in accordance with the first embodiment of the present invention.
Figure 19:
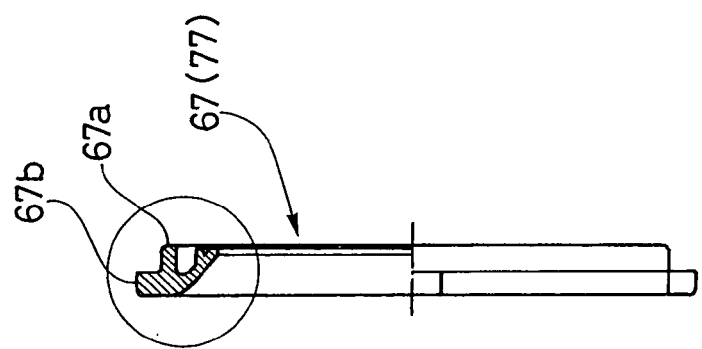
FIG. 19 is an elevational view the outer rubber seal illustrated in FIG. 18 for the left bearing unit of the front bicycle hub illustrated in FIG. 2, with the top half shown in cross-section, in accordance with the first embodiment of the present invention.
Figure 20:
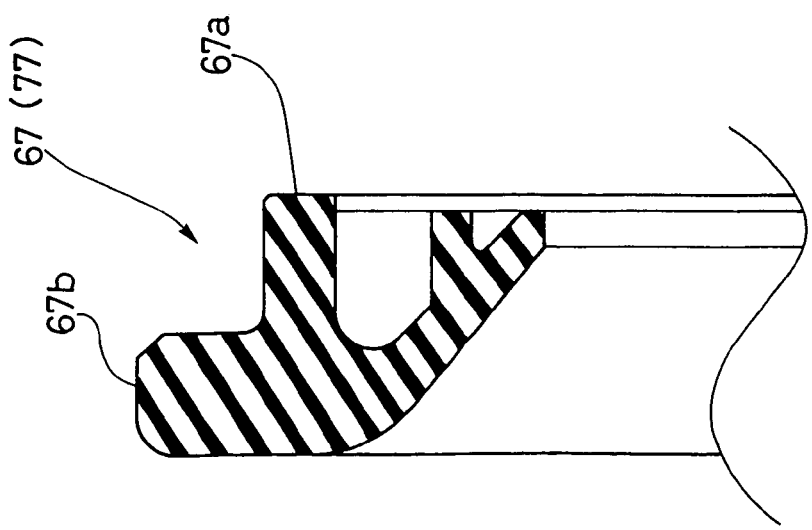
FIG. 20 is an enlarged, partial longitudinal cross-sectional view of the circled portion of the outer rubber seal illustrated in FIG. 19 for the left bearing unit of the front bicycle hub illustrated in FIG. 2 in accordance with the first embodiment of the present invention.

As seen in FIGS. 18–20, the rubber seal 67 includes an annular ring shaped portion 67a with four radially extending tabs 67b that are spaced 90 degrees apart. The tabs 67b are received in the notches 62c of the first outer race 62 for securing the rubber seal 67 to due the first outer race 62. The annular ring shaped portion 67a has an inner opening sized to contact an outer peripheral portion of the first inner race 61. Preferably, the inner section of the annular ring shaped portion 67a is slightly deformed when the rubber seal 67 is installed between the first inner and outer races 61 and 62.

As seen in FIGS. 21 and 22, the locking ring 34a has an outer peripheral surface with threads 35 that engaged internal threads 32p of the hub shell 32 and an inner splined opening 36. The splined opening 36 is designed to receive a tool for installing the locking ring 34a.

Again referring to FIG. 2, the second or right side bearing 33b is disposed between the second axle end 40b of the hub axle 40 and the second shell end 32b of the hub shell 32 to rotatably support the second shell end 32b of the hub shell 32 on the second axle end 40b of the hub axle 40. The bearing 33b basically includes a plurality of second balls 70 located between a second inner race or cone 71 supported on the second axle end 40b of the hub axle 40 and a second outer race or cup 72 threadedly coupled to the second internal threads 32r of the hub shell 32. The second inner and outer races 71 and 72 and the second balls 70 are held together as a single bearing unit by a split snap ring or stopper ring 73. The second bearing 33b further includes a ball bearing retainer 74, an inner seal 75, a seal ring 76 and an outer rubber seal 77. Parts 74, 75, 76 and 77 are relatively conventional parts, and thus, these parts will not be discussed in detail herein.

The second inner race 71 includes a second outer angular bearing surface 71a that radially and axially contacts the second rolling members 70 such that the second outer angular bearing surface 71a contacts and supports each of the second rolling members 70 at an inner peripheral area and an axial facing area. The second outer angular bearing surface 71a faces generally outwardly and towards the first axle end 32a of the hub shell 32.

The second outer race 72 includes a second inner angular bearing surface 72a that radially and axially contacts the second rolling members 70 on a side that is opposite from the second outer angular bearing surface 71a such that the second inner angular bearing surface 72a contacts and supports each of the second rolling members 70 at an outer peripheral area and an axial facing area. The second inner angular bearing surface 72a faces generally inwardly and away from the first axle end 32a of the hub shell 32. The second outer race 72 has a second outer peripheral surface with second external threads 72b that are threadedly engaged with the second internal threads 32r formed on the inner tubular surface of the hub shell 32.

When the hub assembly 31 is tighten, the front fork 19 applies opposite axial compressive forces directly to the first and second inner races 61 and 71 of the first and second bearings 33a and 33b, respectively. In particular, the front fork 19 directly contact the outer ends of the first and second inner races 61 and 71, while first and second outer races 62 and 72 directly contact the abutment surfaces 32o and 32s to apply the axial compressive forces directly to the first and second bearings 33a and 33b. Once the desired amount of axial compression is obtained, a fixing bolt (not shown) extending between the left leg of the front fork 19 and the axle 40 can be used to maintain the desired amount of axial compression on the first and second bearings 33a and 33b. Alternatively, the right leg of the front fork 19 can be split with a fixing bolt (not shown) applying a clamping force on the axle 40 can be used to maintain the desired amount of axial compression on the first and second bearings 33a and 33b.

Rear Hub 12'

Figure 23:
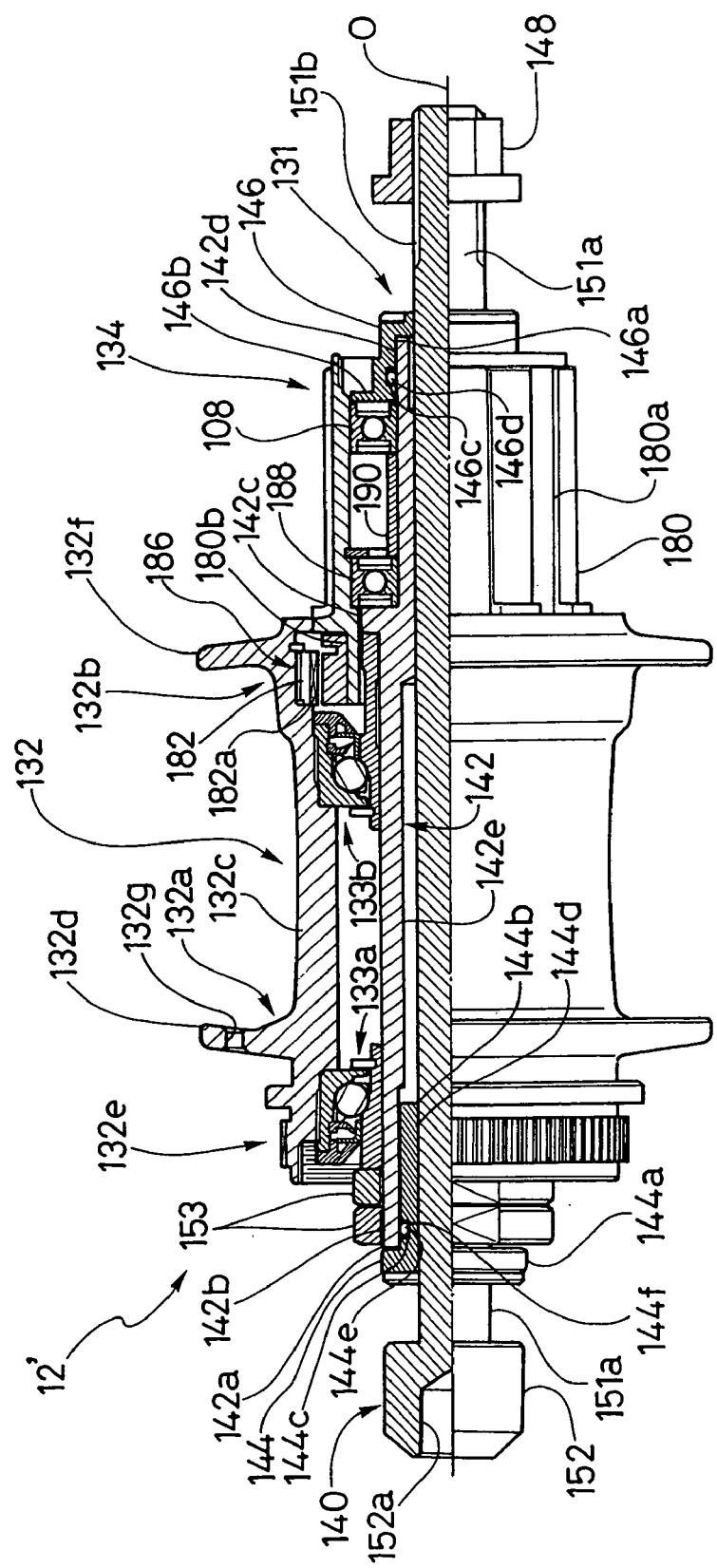
FIG. 23 is a partial longitudinal cross-sectional view of the rear bicycle hub illustrated in FIG. 1 in accordance with a second embodiment of the present invention.
Figure 24:
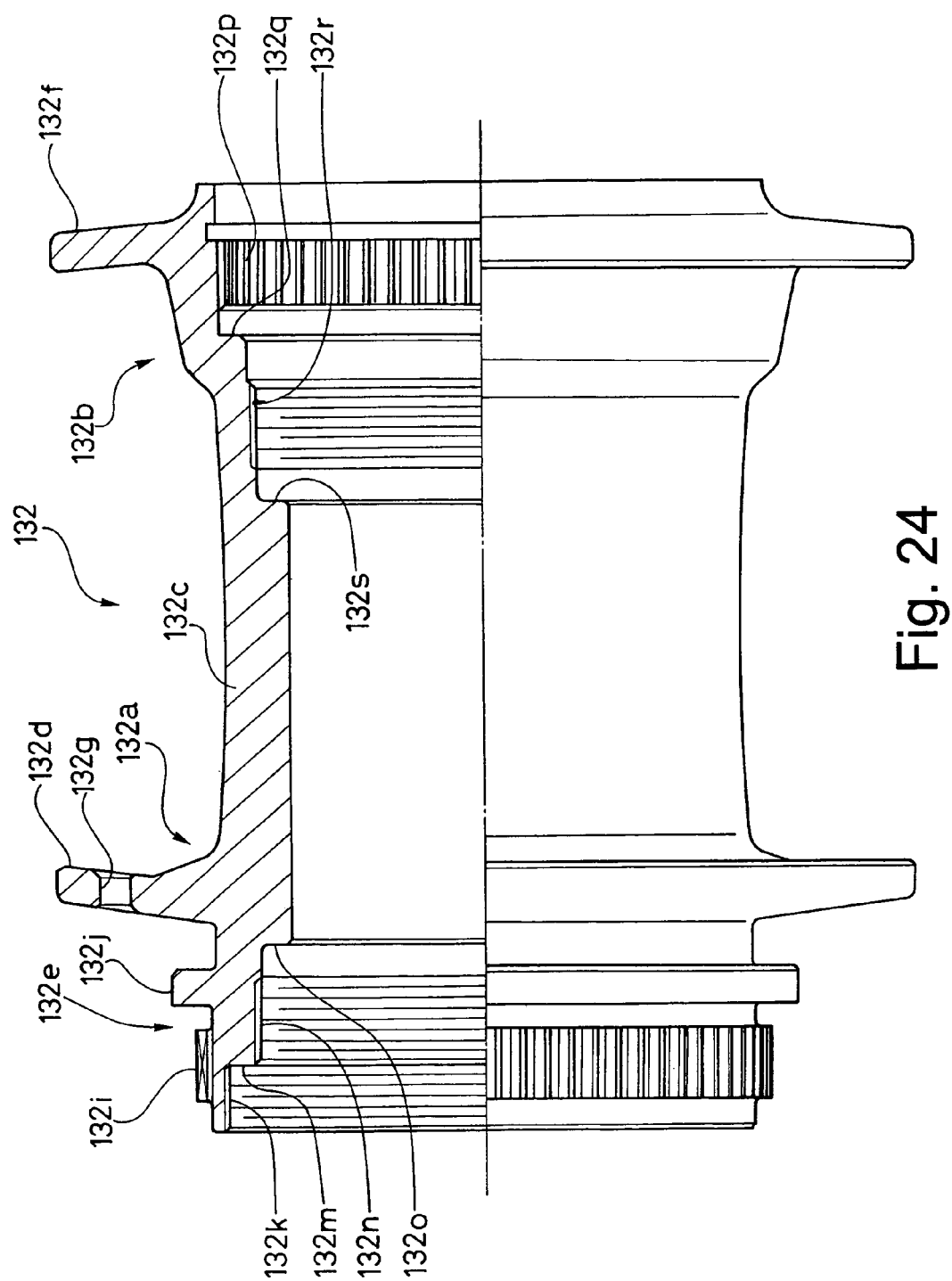
FIG. 24 is an elevational view of a rear hub shell of the rear bicycle hub illustrated in FIG. 23, with the top half shown in cross-section, in accordance with the second embodiment of the present invention.
Figure 25:
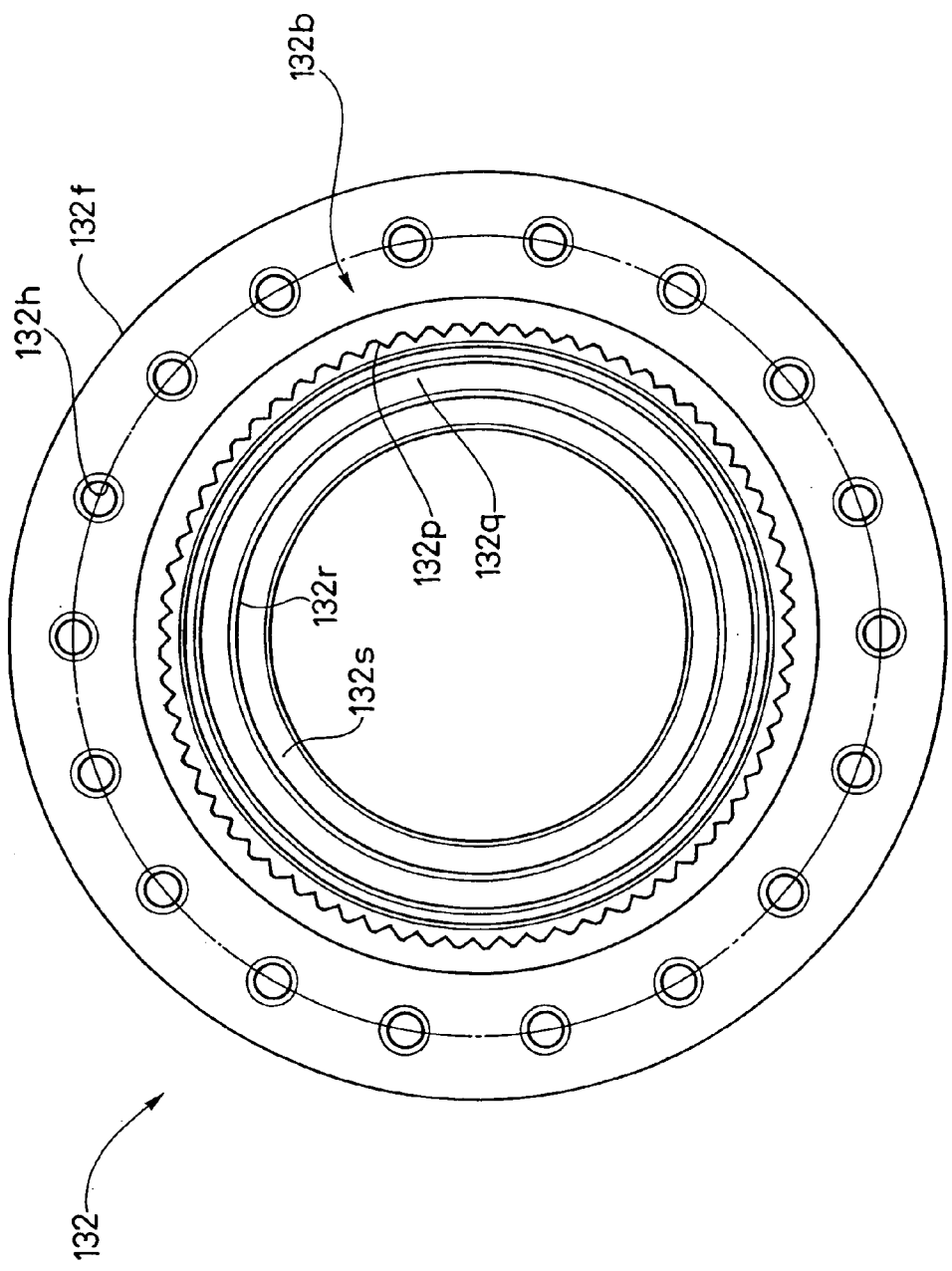
FIG. 25 is a right end elevational view of a rear hub shell illustrated in FIG. 24 in accordance with the second embodiment of the present invention.

Referring now to FIGS. 23–25, the bicycle hub 12' basically includes a hub axle assembly 131, a hub shell 132, a pair of bearings 133a and 133b and a freewheel 134 for receiving the rear sprockets 28. The bearings 133a and 133b rotatably support the hub shell 132 on the hub axle assembly 131 as explained below. In view of the similarities between the front hub 12 and the rear hub 12', the description of the rear hub 12' will be shorten for the sake of brevity.

The hub axle assembly 131 basically includes an axle or spindle 140, an axle sleeve or hub axle 142, a left hub end cap or member 144, a right hub end cap or member 146 and a hub axle nut 148. The hub axle assembly 131 rotatably supports the hub shell 132 via the bearings 133a and 133b and the freewheel 134. As explained below, the freewheel 134 limits rotation of the hub shell 132 to one rotational direction relative to the hub axle assembly 131.

As best seen in FIGS. 23, the spindle 140 is a hard, rigid member that includes a shaft portion 151 and a head portion 152. The shaft portion 151 and the head portion 152 are preferably integrally formed as a one-piece, unitary member from a suitable hard, rigid material. The spindle 140 and the hub axle nut 148 contact the bicycle frame 16 to secure the hub axle assembly 131 thereto. The shaft portion 151 has a first axle end 151a with a threaded section 151b and a second axle end 151c with the head portion 152 fixedly coupled to the second axle end 151c. A center axis O extends longitudinally between the first and second axle ends 151a and 151c.

The head portion 152 of the spindle 140 is configured with a tool engagement surface 152a. The tool engagement surface 152a of the head portion 152 is an axially extending blind bore with a non-circular transverse cross section, preferably a hexagonal cross section.

The hub axle 142 is a tubular member that is concentrically mounted on the spindle 140. The hub axle 142 has a first end 142a with external threads 142b, an annular abutment 142c and a second end 142d with the freewheel 134 fixedly coupled thereto. The external threads 142b of the hub axle 142 receive a pair of locking nuts 153. The locking nuts 153 retain the bearings 133a and 133b between the hub shell 132 and the hub axle 142. The hub axle 142 has a center bore 142e that receives the spindle 140 therein. As mentioned above, the first and second bearings 133a and 133b rotatably support the hub shell 132 relative to both the spindle 140 and the hub axle 142. The annular abutment 142c axially supports the outer end of the second bearing 133b such that the axial compressive forces are applied to the first and second bearings 133a and 133b by the locking nuts 153 when they are threaded on to the external threads 142b of the hub axle 142.

As seen in FIGS. 24 and 25, preferably, the hub shell 132 is preferably formed as a one-piece, unitary member. It will be apparent to those skilled in the art that the hub shell 132 can be constructed of any substantially rigid material, such as those materials, which are known in the art. For example, the hub shell 132 can be constructed of any suitable metallic material, such as plated steel, stainless steel, aluminum, magnesium or titanium, as well as other non-metallic materials, such as carbon fiber composite, ceramic or plastic. Of course, the hub shell 132 could be constructed of several pieces of various different materials as need and/or desired.

The hub shell 132 has a first or left shell end 132a and a second or right shell end 132b with a center tubular portion 132c located therebetween. The first and second hub shell ends 132a and 132b are integral formed with the center tubular portion 132c as a one-piece, unitary member. The hub shell 132 is a tubular member having an inner tubular surface forming a central interior passage extending between the first and second shell ends 132a and 132b. The spindle 140 and the hub axle 142 are disposed within the central passage of the hub shell 132. The first and second bearing 133a and 133b rotatably support the hub shell 132 on the spindle 140 via the hub axle 142 for rotating the hub shell 132 relative to the spindle 140 and the hub axle 142.

The first shell end 132a has a first spoke attachment portion or flange 132d and a brake rotor attachment portion 132e, while the second shell end 132b has a second spoke attachment portion or flange 132f and the freewheel 134 operatively coupled thereto. Thus, the rim 20' is coupled to the first and second spoke flanges 132d and 132f via the spokes 18'. The first spoke flange 132d is preferably an annular member with a plurality of first spoke holes 132g (only one shown in FIG. 23). In this embodiment, the first spoke holes 132g are equally spaced apart about the imaginary circle that is centered on the axis O. The first spoke holes are arranged to receiving the bent ends of the spokes 18. Similarly, the second spoke flange 132f is preferably an annular member with a plurality of second spoke holes 132h in the second spoke flange 132f for receiving the bent ends of the spokes 18. In the illustrated embodiment, the second spoke holes 132h are equally spaced apart about the imaginary circle that is centered on the center axis O of the hub axle assembly 131. Accordingly, the bicycle hub 12' is designed to have the spokes 18 extending outwardly from the first and second spoke flanges 132d and 132f in a generally tangential direction.

The first and second spoke attachment portions 132a and 132b and the brake rotor attachment portion 132e are integrally formed with the hub shell 132 as a one-piece, unitary member. In particular, the first hub shell end 132a has the first spoke flange 132d and the brake rotor attachment portion 132e integrally mounted thereon, while the second hub shell end 132b has the second spoke flange 132f integrally mounted thereon.

The brake rotor attachment portion 132e is integrally formed with the first hub shell end 132a of the hub shell 132 as a one-piece, unitary member. The brake rotor attachment portion 132e is also disposed at the first hub shell end 132a adjacent the first spoke flange 132d. The brake rotor attachment portion 132e is a tubular member, which has a tubular section with an external splines 132i and an annular abutment flange 132j extending outwardly from the tubular section in a radial direction. The annular abutment flange 132j is spaced from the free end of the tubular section of the brake rotor attachment portion 132e. The tubular section of the brake rotor attachment portion 132e also has an annular internal surface with a first set of internal threads 132k. The axially extending external splines 132i of the brake rotor attachment portion 132e non-rotatably engage a disc brake rotor (not shown). The internal threads 132k of the brake rotor attachment portion 132e threadedly engage a locking ring such as disclosed in U.S. Pat. No. 6,371,252 to Kanehisa (Assigned to Shimano, Inc.). Thus, a disc brake rotor can be non-rotatably secured to the brake rotor attachment portion 132e by the locking ring. This locking ring will also aid in preventing the first bearing 133a from unthreading from the hub shell 132.

At the left end of the hub shell 132, the inner tubular surface of the hub shell 132 further includes a first step shaped end portion having the first set of internal threads 132k, a first axial abutment surface 132m, a second set of internal threads 132n and a second axial abutment surface 132o. The internal threads 132n fixedly secure the first bearing 133a to the first shell end 132a in the same manner as the first embodiment (the bearing 33a). Preferably, the internal threads 132k are right-hand threads, while the internal threads 132n are left-hand threads.

At the right end of the hub shell 132, the inner tubular surface of the hub shell 132 includes a second step shaped portion having a set internal splines 132p, a first axial abutment surface 132q, a set of internal threads 132r and a second axial abutment surface 132s. The internal splines 132p of the second shell end 132b receive a part of the freewheel 134. The internal threads 132r fixedly secure the second bearing 133b to the second shell end 132b. Preferably, the internal threads 132r are right-hand threads.

The left hub end cap 144 is a tubular member that has an annular end flange 144a and a tubular section 144b. The left hub end cap 144 is fixedly coupled to the first end 142a of the hub axle 142. Preferably, the left hub end cap 144 is press-fitted into the center bore 142e of the first end 142a of the hub axle 142. The end flange 144a preferably has a larger diameter than the second tubular section 144b so as to form a radial abutment surface 144c that contacts the axial end surface of the first end 142a of the hub axle 142. The second tubular section 144b has an outer diameter that is a size to be slidably received within the center bore 142e of the hub axle 142 at the first end 142a of the hub axle 142. The left hub end cap 144 has a center bore 144d that is sized to slidably receive the shaft portion 151 of the spindle 140 therein. Thus, the spindle 140 can be easily removed from the hub axle 142 to replace the rear derailleur 20.

Preferably, the outer surface of the tubular section 144b has an annular recess 144e with an elastomeric O-ring or sealing member 144f located therein. The sealing member 144f frictionally retains the left hub end cap 144 in the center bore 142e of the first end 142a of the hub axle 142. The sealing member 144f also forms a seal between the interface of the outer surface of the tubular section 144b and the inner surface of the center bore 142e of the hub axle 142. Thus, the left hub end cap 144 can be easily slid into and out of the center bore 142e of the hub axle 142. The end flange 144a has a larger outer diameter than the inner thread diameter of the external threads 142b of the hub axle 142 so as to limit axial movement of the locking nuts 153 when the frame 16 contacts this wide contacting surface of the end flange 144a. Because the left hub end cap 144 is only frictionally retained in the center bore 142e of the hub axle 142, the left hub end cap 144 can be easily removed to loosen the locking nuts 153.

The right hub end cap 146 is a cup-shaped member that is fixedly coupled to the second end 142d of the hub axle 142. The freewheel 134 is retained on the hub axle 142 by the right hub end cap 146. Basically, the right hub end cap 146 has an inner step-shaped tubular surface 146a with an outwardly extending flange 146b at its inner axial end. Preferably, the outwardly extending flange 146b is sized to substantially seal the outer axial end of the freewheel 134. Thus, right hub end cap 146 can be easily slid onto and off of the hub axle 142. In other words, because the right hub end cap 146 is only frictionally retained on the hub axle 142, the right hub end cap 146 can be easily attached and removed to install and replace the freewheel 134.

Preferably, the inner tubular surface 146a has annular recess 146c with an elastomeric O-ring or sealing member 146d located therein. The sealing member 146d frictionally retains the right hub end cap 146 on the second end 142d of the hub axle 142. The sealing member 146d also forms a seal between the interface of the outer surface of the second end 142d of the hub axle 142 and the the inner tubular surface 146a.

The hub axle nut 148 is a hard, rigid one-piece, unitary member that includes a threaded bore 148a. The threaded bore 148a is threadedly engaged with the threaded section 151b of the shaft portion 151 to secure the bicycle hub axle assembly 131 to the bicycle frame 16.

When the locking nuts 153 are threaded on to the external threads 142b of the hub axle 142, an axial compressive force is applied directly to the first and second inner races 161 and 171 of the first and second bearings 133a and 133b, respectively. In particular, one of the locking nuts 153 directly contacts the first inner race 161 of the first bearing 133a, while the annular abutment 142c directly contacts the second inner race 171 of the second bearing 133b to apply the axial compressive force directly to the first and second inner races 161 and 171 of the first and second bearings 133a and 133b. Thus, the locking nuts 153 can be tightened to compensate for wear in the first and second bearings 133a and 133b.

The freewheel 134 is operatively coupled between the second end of the spindle 140 and the second end of the hub shell 132. The freewheel 134 is relatively conventional, and thus, will not be discussed or illustrated in detail herein. The freewheel 134 is partially recessed into the second spoke flange 132f. In particular, the second spoke flange 132f has a recess area formed by the internal splines 132p that is concentric with the interior passage 132c for receiving an inner portion of the freewheel 134. In other words, the second spoke flange 132f overlaps the inner portion of the freewheel 134.

The freewheel 134 is coupled to the hub shell 132 in a relatively conventional manner. The sprockets 28 are mounted on the freewheel 134 in a relatively conventional manner such that rotation of the sprockets 28 results in rotation of the freewheel 134. Rotation of the freewheel 134 in turn rotates the hub shell 132. The freewheel 134 basically includes of a driving cylinder 180, a driven cylinder 182, a unidirectional rotation transmission mechanism 186 and a pair of ball bearings 188 that are axially spaced apart by a cylindrical spacer 190.

The driving cylinder 180 is a tubular member having an outer peripheral surface with a plurality of axially extending splines 180a formed at its outer end and a plurality of transmission pawls 180b (only one shown in FIG. 23) coupled to at its inner end. The inner peripheral surface of the driving cylinder 180 is rotatably supported on the hub axle 142 by the ball bearings 188. The transmission pawls 180b form a first part of the unidirectional rotation transmission mechanism 186. Thus, the inner axial end of the driving cylinder 180 is operatively coupled to the driven cylinder 182 via the unidirectional rotation transmission mechanism 186. The splines 180a non-rotatably couple the sprockets 28 to the outer peripheral surface of the driving cylinder 180. Thus, the sprockets 28 are mounted to the driving cylinder 180 for transmitting torque to the hub shell 132 via the unidirectional rotation transmission mechanism 186.

The driven cylinder 182 has its outer peripheral surface fixed to an inner peripheral surface of the splines 132p formed in the second shell end 132b of the hub shell 132. The driven cylinder 182 has an inner peripheral surface with serrated teeth 182a that form a second part of the unidirectional rotation transmission mechanism 186. These serrated teeth 182a are engaged by the transmission pawls 180b in a conventional manner. Thus, the unidirectional rotation transmission mechanism 186 is constructed of the transmission pawls 180b and the serrated teeth 182a that form a one-way clutch that is operatively coupled between the driving cylinder 180 and the driven cylinder 182. The transmission pawls 180b are moved outwardly in a radial direction to mesh with the serrated teeth 182a due to centrifugal forces occurring from the positive rotation of the driving cylinder 180. This engagement of the transmission pawls 180b with the serrated teeth 182a transmits the driving power or torque from the freewheel 134 to the hub shell 132 that is splined engaged with the driven cylinder 182.

As mentioned above, the ball bearings 188 rotatably support the driven cylinder 182 on the hub axle 142 such that the driven cylinder 182 and the hub shell 132 rotates in one direction relative to the driving cylinder 180. in other words, the driven cylinder 182 is adapted, by means of the unidirectional rotation transmission mechanism 186 and the ball bearings 188, to freely rotate in one direction relative to the driving cylinder 180.

As used herein, the following directional terms "forward, rearward, above, downward, vertical, horizontal, below and transverse" as well as any other similar directional terms refer to those directions relative to a bicycle equipped with the present invention. Accordingly, these terms, as utilized to describe the present invention should be interpreted relative to a bicycle equipped with the present invention.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle hub comprising:
a hub axle having a first axle end and a second axle end with a center axis extending between the first and second axle ends;
a hub shell having a first shell end and a second shell end with an inner tubular surface forming a central passage extending between the first and second shell ends, the hub axle being disposed within the central passage of the hub shell, the inner tubular surface at said first shell end being formed with a first step-shaped end portion having an outer set of internal threads, an inner set of internal threads and an outer axial abutment surface formed between the outer set of internal threads and the inner set of internal threads;
a first bearing unit disposed between the first axle end of the hub axle and the first shell end of the hub shell to rotatably support the first shell end of the hub shell on the first axle end of the hub axle, the first bearing unit including:
a first inner race supported on the first axle end of the hub axle,
a first outer race threadedly coupled to the inner set of internal threads of the inner tubular surface of the hub shell, and
a plurality of first rolling members disposed between the first. inner race and the first outer race; and
a second bearing unit disposed between the second axle end of the hub axle and the second shell end of the hub shell to rotatably support the second shell end of the hub shell on the second axle end of the hub axle;

wherein:
the first inner race is an inner cone that includes a first outer angular bearing surface facing towards the second axle end and contacting one axial side of the first rolling members such that the first outer angular bearing surface contacts and supports each of the first rolling members at an inner peripheral area and an axial facing area; and
the first outer race is an outer cup that includes a first inner angular bearing surface facing towards the first axle end and contacting the first rolling members on an axial side that is opposite from the first outer angular bearing surface such that the first inner angular bearing surface contacts and supports each of the first rolling members at an outer peripheral area and an axial facing area.

2. The bicycle hub according to claim 1, wherein the first outer race has a first outer peripheral surface with first external threads that are threadedly engaged with first internal threads formed on the inner tubular surface of the hub shell.

3. The bicycle hub according to claim 1, wherein the first outer race has a first tool engagement structure at its axial end that is configured to receive a tool to rotate the first outer race.

4. The bicycle hub according to claim 1, wherein the second bearing unit includes a second inner race supported by the second axle end of the hub axle, a second outer race threadedly coupled to the inner tubular surface of the hub shell, and a plurality of second rolling members disposed between the second inner race and the second outer race.

5. The bicycle hub according to claim 4, wherein the second inner race is an inner cone that includes a second outer angular bearing surface facing towards the first axle end and contacting one axial side of the second rolling members such that the second outer angular bearing surface contacts and supports each of the second rolling members at an inner peripheral area and an axial facing area; and
the second outer race is an outer cup that includes a second inner angular bearing surface facing towards the second axle end and contacting the second rolling members on an axial side that is opposite from the second outer angular bearing surface such that the second inner angular bearing surface contacts and supports each of the second rolling members at an outer peripheral area and an axial facing area.

6. The bicycle hub according to claim 5, further comprising
a first axial compression structure coupled to the first axle end of the hub axle and arranged to axially contact the first inner race of the first bearing unit;
a second axial compression structure coupled to the second axle end of the hub axle and arranged to axially contact the second bearing unit; and
a bearing spacer disposed over an outer periphery of the hub axle, the bearing spacer having a first spacer end contacting the first inner race of the first bearing unit and a second spacer end contacting the second bearing unit.

7. The bicycle hub according to claim 6, wherein the first outer race has a first outer peripheral surface with first external threads that are threadedly engaged with first internal threads formed on the inner tubular surface of the hub shell; and
the second outer race has a second outer peripheral surface with second external threads that are threadedly engaged with second internal threads formed on the inner tubular surface of the hub shell.

8. The bicycle hub according to claim 1, further comprising
a first axial compression structure coupled to the first axle end of the hub axle and arranged to axially contact the first inner race of the first bearing unit; and
a second axial compression structure coupled to the second axle end of the hub axle and arranged to axially contact a second inner race of the second bearing unit.

9. The bicycle hub according to claim 1, further comprising
a bearing spacer disposed over an outer periphery of the hub axle, the bearing spacer having a first spacer end contacting the first inner race of the first bearing unit and a second spacer end contacting the second bearing unit.

10. The bicycle hub according to claim 7, wherein
the first outer race has a first tool engagement structure at its axial end that is configured to receive a tool to rotate the first outer race; and
the second outer race has a second tool engagement structure at its axial end that is configured to receive a tool to rotate the second outer race.

11. A bicycle hub comprising:
a hub axle having a first axle end and a second axle end with a center axis extending between the first and second axle ends;
a hub shell having a first shell end and a second shell end with an inner tubular surface forming a central passage extending between the first and second shell ends, the hub axle being disposed within the central passage of the hub shell, the inner tubular surface at said first shell end being formed with a first step-shaped end portion having an outer set of internal threads, an inner set of internal threads and an outer axial abutment surface formed between the outer set of internal threads and the inner set of internal threads;
a first bearing unit disposed between the first axle end of the hub axle and the first shell end of the hub shell to rotatably support the first shell end of the hub shell on the first axle end of the hub axle, the first bearing unit including:
a first inner race supported by the first axle end of the hub axle,
a first outer race supported by the inner set of internal threads of the inner tubular surface of the hub shell,
a plurality of first rolling members disposed between the first inner race and the first outer race, and
a first stopper ring coupled to one of the first inner and outer races to form an axial abutment that is arranged to contact the other of the first inner and outer races to prevent axial separation of the first inner and outer races prior to installation of the first bearing unit between the hub axle and the hub shell; and
a second bearing unit disposed between the second axle end of the hub axle and the second shell end of the hub shell to rotatably support the second shell end of the hub shell on the second axle end of the hub axle.

12. The bicycle hub according to claim 11, wherein
the first inner race is an inner cone that includes a first outer angular bearing surface facing towards the second axle end and contacting one axial side of the first rolling members such that the first outer angular bearing surface contacts and supports each of the first rolling members at an inner peripheral area and an axial facing area; and
the first outer race is an outer cup that includes a first inner angular bearing surface facing towards the first axle end and contacting the first rolling members on an axial side that is opposite from the first outer angular bearing surface such that the first inner angular bearing surface contacts and supports each of the first rolling members at an outer peripheral area and an axial facing area.

13. The bicycle hub according to claim 11, wherein
the first stopper ring is a split ring that is located in a groove formed in the first inner race.

14. The bicycle hub according to claim 11, wherein the first outer race has a first outer peripheral surface with first external threads that are threadedly engaged with first internal threads formed on the inner tubular surface of the hub shell.

15. The bicycle hub according to claim 11, wherein the second bearing unit includes a second inner race supported by the second axle end of the hub axle, a second outer race supported by the inner tubular surface of the hub shell, a plurality of second rolling members disposed between the second inner race and the second outer race, a second stopper ring coupled to one of the second inner and outer races to form an axial abutment that is arranged to contact the other of the second inner and outer races to prevent axial separation of the second inner and outer races prior to installation of the second bearing unit between the hub axle and the hub shell.

16. The bicycle hub according to claim 15, wherein
the first inner race is an inner cone that includes a first outer angular bearing surface facing towards the second axle end and contacting one axial side of the first rolling members such that the first outer angular bearing surface contacts and supports each of the first rolling members at an inner peripheral area and an axial facing area;
the first outer race is an outer cup that includes a first inner angular bearing surface facing towards the first axle end and contacting the first rolling members on an axial side that is opposite from the first outer angular bearing surface such that the first inner angular bearing surface contacts and supports each of the first rolling members at an outer peripheral area and an axial facing area;
the second inner race is an inner cone that includes a second outer angular bearing surface facing towards the first axle end and contacting one axial side of the second rolling members such that the second outer angular bearing surface contacts and supports each of the second rolling members at an inner peripheral area and an axial facing area; and
the second outer race is an outer cup that includes a second inner angular bearing surface facing towards the second axle end and contacting the second rolling members on an axial side that is opposite from the second outer angular bearing surface such that the second inner angular bearing surface contacts and supports each of the second rolling members at an outer peripheral area and an axial facing area.

17. The bicycle hub according to claim 15, wherein
the first stopper ring is a split ring that is located in a groove formed in the first inner race; and
the second stopper ring is a split ring that is located in a groove formed in the second inner race.

18. The bicycle hub according to claim 15, wherein the first outer race has a first outer peripheral surface with first external threads that are threadedly engaged with first internal threads formed on the inner tubular surface of the hub shell; and
the second outer race has a second outer peripheral surface with second external threads that are threadedly engaged with second internal threads formed on the inner tubular surface of the hub shell.

19. The bicycle hub according to claim 15, wherein the first outer race has a first tool engagement structure at its axial end that is configured to receive a tool to rotate the first outer race; and
the second outer race has a second tool engagement structure at its axial end that is configured to receive a tool to rotate the second outer race.

20. A bicycle hub comprising:
a hub axle having a first axle end and a second axle end with a center axis extending between the first and second axle ends;
a hub shell having a first shell end and a second shell end with an inner tubular surface forming a central passage extending between the first and second shell ends, the hub axle being disposed within the central passage of the hub shell, the inner tubular surface at said first shell end being formed with a first step-shaped end portion having an outer set of internal threads, an inner set of internal threads and an outer axial abutment surface formed between the outer set of internal threads and the inner set of internal threads;
a first bearing unit disposed between the first axle end of the hub axle and the first shell end of the hub shell to rotatably support the first shell end of the hub shell on the first axle end of the hub axle, the first bearing unit including:
a first inner race supported on the first axle end of the hub axle,
a first outer race threadedly coupled to the inner set of internal threads of the inner tubular surface of the hub shell, and
a plurality of first rolling members disposed between the first inner race and the first outer race;
a second bearing unit disposed between the second axle end of the hub axle and the second shell end of the hub shell to rotatably support the second shell end of the hub shell on the second axle end of the hub axle;
a first axial compression structure coupled to the first axle end of the hub axle and arranged to axially contact the first inner race of the first bearing unit; and
a second axial compression structure coupled to the second axle end of the hub axle and arranged to axially contact a second inner race of the second bearing unit.

* * * * *